(12) United States Patent
Mabon

(10) Patent No.: US 7,061,549 B1
(45) Date of Patent: Jun. 13, 2006

(54) METHOD FOR STORAGE OF A CHANNEL FOR A CONSUMER ELECTRONICS APPLIANCE

(75) Inventor: Jean-Bernard Mabon, Villingen-Schwenningen (DE)

(73) Assignee: Deutsche Thomson-Brandt GmbH, Villengen-Schwenningen (DE)

( * ) Notice: Subject to any disclaimer, the term of this patent is extended or adjusted under 35 U.S.C. 154(b) by 0 days.

(21) Appl. No.: 09/786,610

(22) PCT Filed: Sep. 3, 1999

(86) PCT No.: PCT/EP99/06478

§ 371 (c)(1),
(2), (4) Date: Mar. 6, 2001

(87) PCT Pub. No.: WO00/16549

PCT Pub. Date: Mar. 23, 2000

(30) Foreign Application Priority Data

Sep. 10, 1998 (DE) .......................... 198 41 298

(51) Int. Cl.
*H04N 5/50* (2006.01)

(52) U.S. Cl. .................. 348/731; 348/732; 725/38; 725/15

(58) Field of Classification Search ................ 348/731, 348/732, 553, 714, 725, 569, 734; 725/15, 725/38; 455/181.1, 186.1, 185.1
See application file for complete search history.

(56) References Cited

U.S. PATENT DOCUMENTS

| | | | | |
|---|---|---|---|---|
| 4,918,531 A | * | 4/1990 | Johnson | 348/565 |
| 5,210,611 A | * | 5/1993 | Yee et al. | 358/191.1 |
| 5,317,403 A | * | 5/1994 | Keenan | 348/731 |
| 5,323,240 A | | 6/1994 | Amano et al. | 348/731 |
| 5,444,499 A | | 8/1995 | Saitoh | |

(Continued)

FOREIGN PATENT DOCUMENTS

| | | |
|---|---|---|
| DE | 4417634 A1 | 5/1994 |
| DE | 4417634 | 11/1994 |
| DE | 4406091 | 8/1995 |
| DE | 19634142 | 2/1998 |
| JP | 164447 | 6/1998 |
| JP | 10-164447 | 6/1998 |
| JP | 220673 | 8/1999 |
| JP | 11-220673 | 8/1999 |
| WO | 98/21877 | 5/1998 |

OTHER PUBLICATIONS

Patent Abstracts of Japan, vol. 1998, No. 11, Sep. 30, 1998, Matsushita Electric Ind. Co. & JP 10–164447.
Database WPI Derwent Publications Ltd. London, GB & JP 11–220673.

*Primary Examiner*—Victor R. Kostak
(74) *Attorney, Agent, or Firm*—Joseph J. Laks; Robert D. Shedd; Reitseng Lin

(57) ABSTRACT

In consumer electronics appliances, for example in the case of a television set, it is known for there to be a key on the remote control which allows the user to switch over to the previously selected channel. However, a disadvantage of this conventional solution is that, once the user has jumped from one channel to the next, which is called zapping, the television recognizes only the last channel in the zapping sequence as the last channel in each case. The invention is based on the object of providing an improved method for storage of a channel. The method according to the invention for storage of a channel in consumer electronics appliance which can be switched over between different channels is distinguished in that the reception duration of the current channel is determined, and in that, as soon as the reception duration exceeds a predetermined time interval ZE, the channel is stored as a channel of interest.

11 Claims, 2 Drawing Sheets

U.S. PATENT DOCUMENTS

| | | | | |
|---|---|---|---|---|
| 5,603,108 A | * | 2/1997 | Thoone | 455/186.1 |
| 5,635,989 A | * | 6/1997 | Rothmuller | 348/563 |
| 5,734,444 A | * | 3/1998 | Yoshinobu | 725/14 |
| 5,745,792 A | * | 4/1998 | Jost | 295/878 |
| 5,801,747 A | * | 9/1998 | Bedard | 725/46 |
| 5,917,481 A | * | 6/1999 | Rzeszewski et al. | 345/327 |
| 6,115,080 A | * | 9/2000 | Reitmeier | 348/731 |
| 6,408,437 B1 | * | 6/2002 | Hendricks et al. | 725/132 |
| 6,505,346 B1 | * | 1/2003 | Saib et al. | 725/38 |

* cited by examiner

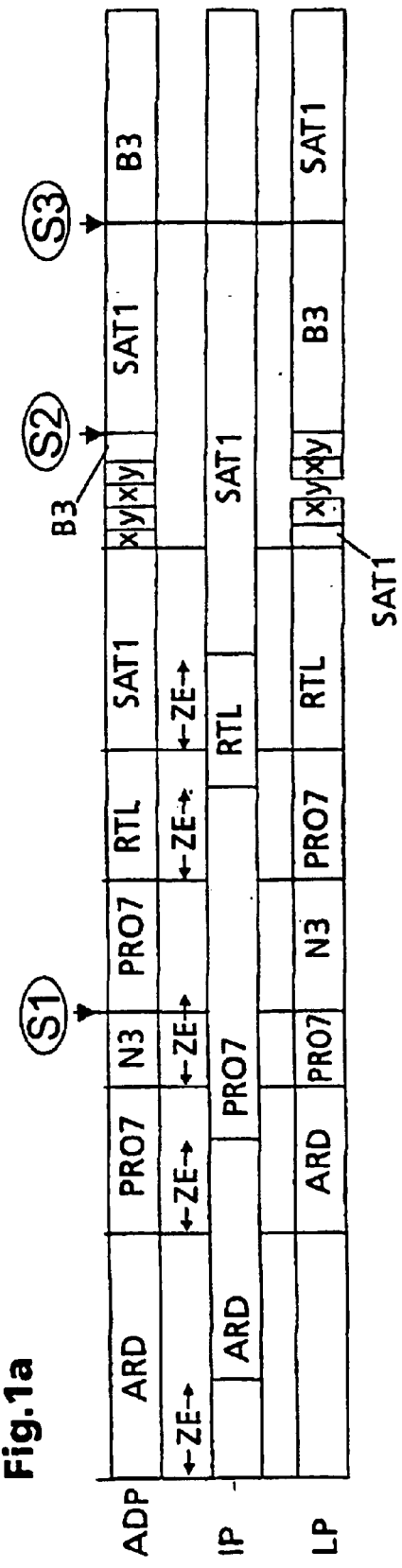
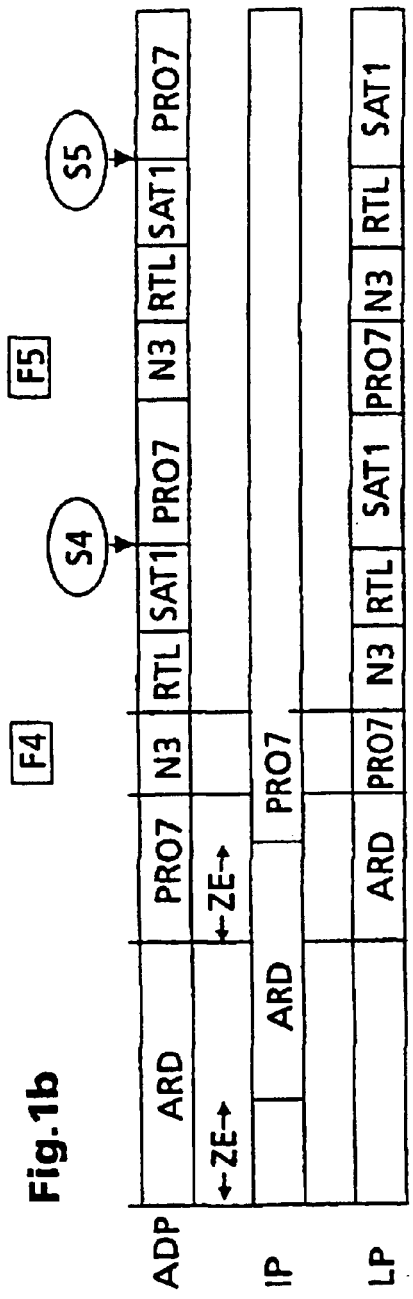
Fig.1a
Fig.1b

METHOD FOR STORAGE OF A CHANNEL FOR A CONSUMER ELECTRONICS APPLIANCE

This application claims the benefit under 35 U.S.C. § 365 of International Application PCT/EP99/06478, filed Sep. 3, 1999, which was published in accordance with PCT Article 21(2) on Mar. 23, 2000 in English, and which claims the benefit of DE 19841298.3, filed Sep. 10, 1998.

BACKGROUND OF THE INVENTION

1. Field of the Invention

The invention is based on a method for storage of a channel for a consumer electronics appliance, in particular for a television set.

The term programme means the respective correspondingly received television programme, for example ARD, ZDF, RTL (German television programmes) etc.

2. Description of the Related Art

In consumer electronics appliances, for example in the case of a television set, it is known for there to be a key on the remote control which allows the user to switch back to the previously selected channel. For example, if a user is looking at a film on one channel but then switches over to a different channel and in the process forgets the channel on which the film is running, he or she can easily switch back to the channel number with the film by pressing this key. It is not necessary to know the programme channel of the programme previously being watched, since the appliance notes this automatically.

However, a disadvantage of this conventional solution is that, once the user has jumped from one channel to the next, which is called "zapping", the television recognizes only the last channel in the zapping sequence as the last channel in each case.

The invention is based on the object of providing an improved method for storage of a channel. This object is achieved by the features of the invention specified in the claims. Advantageous developments of the invention are specified in the dependent claims.

SUMMARY OF THE INVENTION

The method according to the invention for storage of a channel in a consumer electronics appliance which can be switched over between different channels is distinguished in that the reception duration of the current channel is determined, and in that, as soon as the reception duration exceeds a predetermined time interval ZE, the channel is stored as a channel of interest.

If a programme is received for a relatively long term period on one channel, then the predetermined time interval can be used to confirm that the user has remained on that channel for this relatively long time period. If an advertising break, for example, now occurs and the user switches backwards and forwards between the various channels, it is now possible to jump back to the channel which had previously been received for the relatively long time interval.

In a development of the method, the reception duration of the current channel is determined permanently.

In consequence, it is possible to identify a channel of interest even when no changeover has been made. This has the advantage that, if the user inadvertently operates the "channel of interest" function key, which allows a changeover to the channel of interest, the last but one channel of interest would have been stored there if the reception duration of the current channel had not been determined permanently.

Another development of the invention is characterized in that the reception duration of the current channel is determined only until the time interval is reached.

This has the advantage that the microprocessor is relieved of the load as soon as the time interval is reached, and no further counting is required.

The method is further characterized in that the reception duration is determined on switching over from the current channel to a further channel.

If the reception duration on changeover were determined, this would have the advantage that the method according to the invention could be implemented more easily, since the microprocessor would not itself carry out the monitoring of the reception duration, but this would be initiated by the changeover time. The changeover time is also defined by pressing the "channel of interest" function key, in order to carry out an evaluation.

An additional development of the method is characterized in that the time interval is set by the manufacturer and/or the user.

The time interval indicates the point in time from which a channel should or should not be regarded as being of interest. This may, on the one hand, be a permanently preset value of, for example, 30 seconds, while, on the other hand, it is advantageous if this value can be varied by the user. The "channel of interest" function key could thus be programmed individually as a function of time, so that the user can determine the channel that is of interest to him or her, for example, only after a time interval of 3 minutes.

Another development of the method is characterized in that various time intervals are set.

If various time intervals can be set, channels of interest in different categories are determined. For example, one function key could be operated twice, or a plurality of function keys could be operated by means of which it would be possible to switch over to channels with different time intervals.

A further development of the invention is characterized in that a first short time interval, a second medium time interval and a third long time interval are provided, in order in this way to determine different channels of interest.

If the various time intervals were subdivided, for example, into three parts, then the short time interval could be, for example, 30 seconds, the medium time interval could be, for example, 2 minutes and the long time interval could be, for example, 10 minutes, and the user would be able to switch over to the respective channel of interest by pressing different keys.

The method can likewise be characterized in that the reception duration of the current channel is determined, and in that, on switching over from the current channel to a further channel, the reception duration of the further channel is determined, and in that the channel having the longest reception duration is stored as the time interval.

This avoids the need to program the time interval, since the system automatically determines the time interval by measuring the longest reception duration. This possibly has the disadvantage that, if a channel has been received for an extremely long time prior to this, this will always be identified as a channel of interest. The memory should therefore preferably be erased when the appliance is switched off, or a function key would have to be provided to erase the memory.

A function key should preferably also be provided, which the user can operate in order to define a channel which he or she has watched as being a channel of interest. This could be done, for example, by pressing the function key of a channel of interest for longer, and the user then being notified by a message on the screen, such as "stored", or by a signal tone, that the channel that has just been viewed has been stored as a "channel of interest". Storage would also be possible by means of a separate "save key". In this way, it would be possible, if the user had found a channel of interest while switching through, [lacuna] in order that he or she can call it up again later. If the user is given the capability to define such "channels of interest" by means of a plurality of function keys or by operating a key twice, he or she can call them up again at any time later.

One possible refinement is, for example, for the "channel of interest" key to in each case determine the channel which exceeds the time interval, and for a "channel of interest" key combination with a channel number key, for example channel number 1, to call up the channel of interest which the user has stored in channel number 1. This means that, if the user presses the channel number key 1 normally, he receives the channel 1, in most cases ARD, if he presses the "channel of interest" key followed by the channel number key 1, he would receive, for example, the channel Pro7 which he had himself stored as the channel of most interest. In this way, the user could quickly and individually store his or her favourite channels for each evening's television, and even define a ranking sequence by the predetermined rising numbers from 1 to 9 which, as a rule, are used on remote controls.

The method can also be characterized in that all channels which exceed the time interval are stored as channels of interest.

If all channels that exceed the time interval are stored as a channel of interest, the user can call this up from the memory. This would be possible by means of various keys or by repeatedly operating the "channel of interest" key.

The method can otherwise be characterized in that a time indication and/or the respective reception duration are/is also stored for all channels of interest. The method is furthermore characterized in that the data are stored and/or called chronologically and/or on the basis of the reception duration.

Since time indications, such as the time of day and the date, are also stored, it is possible to define the sequence in which the channels of interest can be called up again, as soon as they have been stored using a function key. After the "reception duration", the channel which the user has watched for the longest time will be the first to be called up again, while the channel which has been watched for the second longest time will be the second, etc. An inverse solution could also be provided. On the basis of "time indications", it would be possible to call up the data chronologically, that is to say the user remembers the channel which he or she watched last or, for example, as the third-last station and, the more frequently the "channel of interest" key is pressed, the further away he or she is in time from the channel watched. By his or her memory capability, he or she can then quickly once more find the channel that is of most interest to him or her.

The method can also be characterized in that a changeover to the channel of most interest is made by operating a control element.

In this way, that is to say via the "channel of interest" key, it is possible (as already described above) to switch back to the channel of interest.

It is also possible to use a menu control to access the method according to the invention. With the aid of the menu, helpful information for handling can then also be overlaid for the user.

The method can also be characterized in that a changeover to the last but one channel of interest is made by operating the control element once again.

This double use provides the user with the capability to look at different channels of interest in a simple way.

The method can furthermore be characterized in that a plurality of control elements are provided for different channels of interest.

Since the double use of a function key is limited in that extreme utilization leads to confusion, different control elements are preferably used for the channels of interest. It would also be possible for the function keys to have specific shapes so that if, for example, one function key were marked as a small television, the user could in this case generate films, so-called movies which are currently running, as a channel of interest. If a key were marked with two circles indicating stereo sound, the user could thus be informed of music programmes. A key marked X could also be used to indicate x-desired channels.

A next development of the method is characterized in that a picture relating to the channels of interest is also stored as video information in a frame memory.

Since relatively modern televisions have frame memories, such a frame memory could also be used to additionally store the picture relating to the channel of interest which was determined by the user himself or herself or by the method. In this way, the user is reminded of the channel really quickly. This would be advantageous if a television viewer had switched on and watched the television over a relatively long time period, for example three hours, since, in this period, the channel of interest on the same channel would already have been replaced by the next programme so that, for example, if the film of interest were followed by a programme of no interest, the user can use the picture associated with the channel of interest to find it. This picture could be stored automatically after the time interval had been exceeded, or could be stored using the method described above.

It is also possible for a signal also to be evaluated in order to erase the memory for the channel of interest after a programme has ended. The signal could be, for example, the VPS signal.

The method can furthermore be characterized in that, when the control element is operated, the video information and/or the channel information are/is also overlaid.

In this way, the user is supplied with additional information, which makes the system more user-friendly.

The method can also be characterized in that a number of video information items are displayed on the screen by operating a control element, and can be selected via a control element.

If a number of channels of interest are stored with video, then they could be displayed, for example, like a mosaic on the screen and, using the video content, the user can then call up the corresponding channel again using cursor keys or other function keys. This would be advantageous, for example, if all channels, as already mentioned above, which exceed the time interval are selected as a channel of interest, and the user is then provided with the capability of having all the channels displayed on the screen, and then making his or her specific selection. If the time interval is, for example, chosen to be really short, for example 10 seconds or even 2 seconds, then after he or she had quickly zapped through the programmes the user could use the channels of interest key to display, for example, the last nine channels of interest like a mosaic on the television screen, and then to make his or her selection.

The method can furthermore be characterized in that the channel of interest is called up by voice input.

Since, at the moment, voice synthesizers are increasingly being adopted for controlling consumer electronic appliances, it is possible that the user will no longer have any control elements as such, but will make an input by means of voice commands. Thus, for example, when different time intervals are present, the user could use the command "short i channel" to call up the short channel of interest. The basic idea in this case is that the data which are stored can be called up directly again via specific channel commands, and that long or complicated words are replaced by abbreviations or by new words. It would thus also be conceivable for the currently quoted channel of interest to be described as the "Smart Last Station Switch". The term channel of interest has been defined as such by the various options which have already been described so far or are still to follow. It is thus possible for the channel of interest to be defined as a single i channel, as already indicated.

A further development of the method for determining a channel in a consumer electronics appliance which can be switched over between different channels is characterized in that the reception duration of the current channel is determined and in that, as soon as the reception duration falls below a predetermined time interval, the channel is defined as a channel which is not of interest.

This bypassing solution in order to determine a channel of interest represents the detection and masking out of a channel which is not of interest and/or [lacuna] if this channel which is not of interest is intended to be watched. For example, all channels which are shorter than the time interval are detected while zapping through and then become [lacuna], since the television receiver contains a summary of all its channels in the memory, which preferably does not access channels which are found in this way and are not of interest, using the control element. However, it would be possible to access all other channels using this control element.

In order to determine a channel of interest, data can furthermore be evaluated such as the switching sequence and the rate of switching, so that the behaviour of the user is in this way exclusively and/or additionally also evaluated. That is to say channels which are watched frequently are, for example, channels of interest. Channels which are switched away from again quickly are, for example, channels which are not of interest. These channels of interest determined in this way could in turn be called up by a control element. The channels which are not of interest could, for example, be ignored when zapping through the channels, until the user activates them once again for zapping. The activation could be carried out by the user using a menu or a control element to allocate the "channel of interest" status to this channel once again.

A circuit for the method for determining a channel of interest in a consumer electronics appliance having a control unit, having a memory, having a channel signal and having control elements is characterized in that, when the control elements are used for switching over, the control unit detects the reception duration, for how long the respective channel was activated, and as soon as the reception duration falls below a previously set time interval, this, is stored as a channel of interest in the memory.

Furthermore, the circuit is distinguished in that a channel name and/or transmitter frequency and/or channel details and/or ShowView data and/or teletext information are stored as channel-specific data.

BRIEF DESCRIPTION OF THE DRAWINGS

The invention will be explained in the following text with reference to the drawings and using a plurality of exemplary embodiments. In the drawing, FIG. 1 shows a schematic illustration of how a channel of interest is determined.

DETAILED DESCRIPTION OF THE INVENTION

FIGS. 1*a* and 1*b* illustrate different cases which show which channel is the respective channel of most interest. This can then be stored in a memory. The channels currently being shown are in each case listed in the upper bar ADP. The channels of interest are listed in the lower bar IP. The classical (known) solution is listed in the bar LP, represented by the last channel.

The case S1 is the first matter to be explained in FIG. 1*a*. At the time S1, the user in the classical case presses the "Last Channel" key, and in the present case presses the "channel of interest" key. The arrows ZE indicate a time interval for a channel of interest. This time interval could be, for example, 30 seconds. The user has thus viewed the ARD channel and the time interval ZE has been exceeded. He has then watched the channel Pro7 and the time interval ZE has likewise been exceeded. After this, he or she watched the channel 3, and activates the "channel of interest" key at the time S1. In this case, since the Pro7 channel was the last to exceed the time interval ZE, the television set switches to the Pro7 channel. This can also be seen from the "channel of interest" bar since, as soon as the time interval ZE is exceeded, the respective channel which has led to the time interval ZE being exceeded is stored in a memory. The memory contents are thus in each case listed in this IP bar. This is the same as for the last channel LP with the classical method. With the classical solution, the user would have switched to the N3 channel at the time of the case S1.

The case S2 shows that the user briefly watched various different programmes, for example while zapping through, and, in the end, wanted to return to the channel being watched before zapping. At the time S2 shown in the figure, he or she thus presses the "channel of interest" key reaches the SAT1 channel which had previously exceeded the time interval. In the classical case, he or she would once again arrive, via the last channel control element, at the last channel number while zapping through, which was Bayern 3 B3 (Bavarian third programme)

The case S3 shows the situation in which the user pressed the classical "last channel" key at the time S3. Double use of the "channel of interest" control element and of the classical "last channel" control element would be conceivable, by briefly pressing the key to call up the channel of interest, and by pressing it for longer to call up the last channel.

FIG. 1*b* shows the cases S4, S5 and that, at the time S4, S5, Pro7 was recorded in the memory as the last channel to exceed the time interval ZE, and the other illustrated channels have not exceeded the time interval.

Figure 2A:
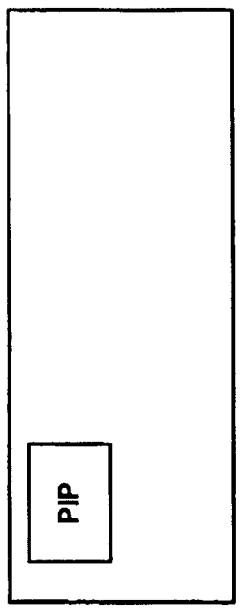
FIGS. 2*a*–*c* illustrate channels of interest using a frame memory.

FIG. 2 shows an illustration of the channel of interest. For example, it is possible, as shown in FIG. 2a, for the channel which is currently of interest to be overlaid for the user using the Picture in Picture PIP feature and, as soon as a channel of interest has been determined by the time interval being exceeded once again, for the picture then to be updated, or the channel change to be indicated, provided this is not a stored picture.

Figure 2B:
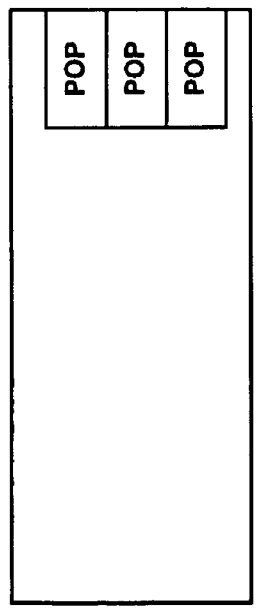

FIG. 2b shows the Picture out of Picture POP version. If the memory is designed in such a way that a number of channels of interest can be displayed, these could be overlaid one below the other alongside the main picture in the illustration 2b. In order to avoid using an excessively large number of television tuners, it would also be feasible to operate with frame memories which are continuously updated.

Figure 2C:
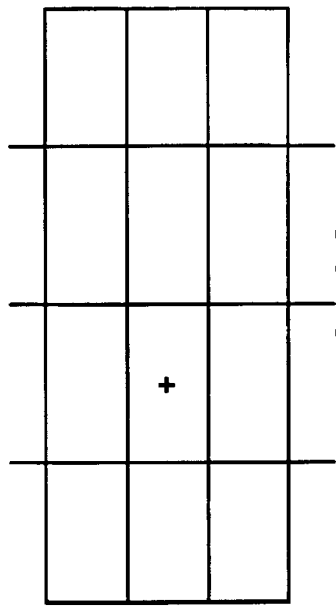

FIG. 2c shows a number of channels of interest being displayed in mosaic form, from which the user can then use the cursor, represented by the + in this case, to select the channel of interest to him or her. It would also be possible for frame memories to be used which are updated by the system after a specific time, for example after 2–3 seconds, so that the current video for the programme always appears there, providing the user with a good chronological overview.

The respective overlaying process PIP, POP or MOSAIK can be activated via a menu, not shown here.

Figure 3:
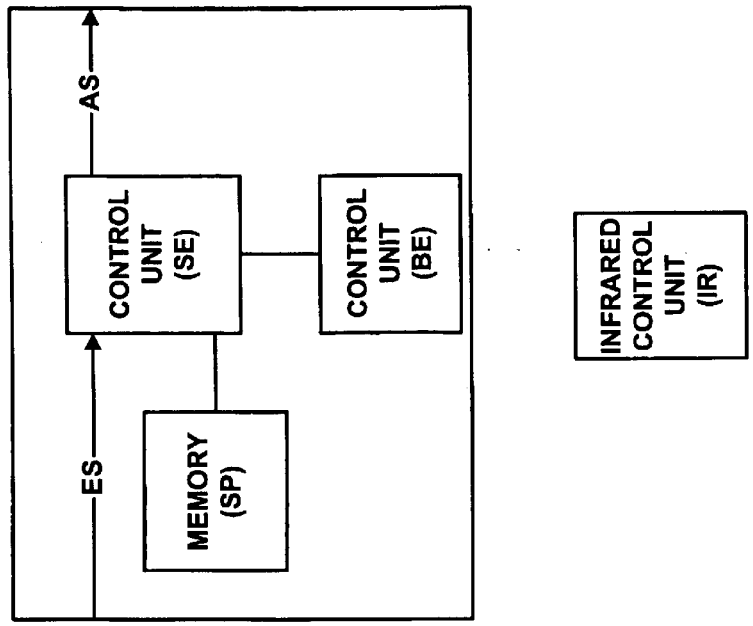
FIG. 3 shows a block diagram according to the invention.

FIG. 3 shows a block diagram having a control unit SE, a memory SP, an input signal ES, an output signal AS and having a control unit BE directly on the appliance, or an infrared control unit IR. A counter which monitors the time interval is provided in the control unit SE. Thus, when the input signal ES which is supplied to the control unit SE and contains the channel information about which channel is currently being received is received for the predetermined time interval, for example for more than 30 seconds, this channel is stored as a channel of interest in the memory SP. If the user uses the control unit BE or the remote control IR to switch to another channel, and this once again exceeds the time interval, then this channel is stored as a channel of interest in the memory SP. Since, after the 17$^{th}$ channel which he or she has briefly zapped through, for example with less than 5 seconds in each case, the user wishes to jump back to the previous channel of interest, he or she operates the "channel of interest" function key on the remote control or on the appliance, and the control unit SE then switches through the data stored in the memory data which are stored in the memory SP relating to the appropriate channels are, for example, the name, the transmitter frequency, channel details, ShowView data, teletext information or any information which would be of interest for the system as such. The consumer electronics appliance, which is in this case represented by the block diagram, could be a television, a satellite receiving system or else a radio receiver, since these fundamental components are present in all appliances, and the method can also be applied to all appliances.

Although the invention has been explained with reference to television channels, it can also be applied to other broadcast radio programmes.

What is claimed is:

1. A method for storing and selecting a single broadcast channel of interest in a consumer electronics appliance, which can be switched over between different channels, comprising the steps of:
   determining if an uninterrupted reception duration of a currently received channel has exceeded a time interval, said determining step being performed only until said uninterrupted reception reception duration exceeds said time interval;
   memorizing said currently received channel as said single channel of interest, in response to determining that said uninterrupted reception duration of said currently received channel exceeds said time interval;
   identifying switching between said different channels; and
   changing over to said single channel of interest upon activation of a dedicated command.

2. The method according to claim 1, further comprising the step of enabling a user to set said time interval.

3. The method according to claim 1, wherein said changing over step is initiated by operating a control element.

4. The method according to claim 1, further comprising the step of storing a picture relating to said single channel of interest as video information in a frame memory.

5. The method according to claim 1, further comprising the step of erasing said single channel of interest after a program on said single channel of interest has ended.

6. The method according to claim 1, wherein the changing over step comprises the step of displaying said single channel of interest using a picture in picture feature.

7. A method for storing and selecting a single channel of interest for a television set, which can be switched over between different program channels, comprising the steps of:
   setting a time interval;
   determining if an uniterrupted reception duration of a currently received channel has exceeded said time interval, said determining step being performed only until said uninterrupted reception duration exceeds said time interval;
   memorizing said currently received channel as said single channel of interest in response to determining that said uninterrupted reception duration of said currently received channel exceeds said time interval;
   identifying switching between said different program channels; and
   changing over directly to said single channel of interest upon activation of a dedicated command.

8. The method according to claim 7, wherein said changing over step is initiated by operating a control element.

9. The method according to claim 7, further comprising the step of storing a picture relating to said single channel of interest as video information in a frame memory.

10. The method according to claim 7, further comprising the step of erasing said sinlge channel of interest after a program on said single channel of interest has ended.

11. The method according to claim 7, wherein the changing over step comprises the step of displaying said single channel of interest using a picture in picture feature.

* * * * *